UNITED STATES PATENT OFFICE.

WILHELM OSBORNE AND HEINRICH SCHUPP, OF MUNICH, GERMANY, ASSIGNORS TO LUDWIG SENSBURG, OF MUNICH, GERMANY.

PROCESS OF CONVERTING CATECHIN INTO A CATECHU-TANNIC ACID.

No. 913,426.     Specification of Letters Patent.     Patented Feb. 23, 1909.

Application filed August 9, 1906. Serial No. 329,918.

*To all whom it may concern:*

Be it known that we, WILHELM OSBORNE and HEINRICH SCHUPP, citizens of Germany, residing at Munich, Bavaria, Germany, have invented certain new and useful Improvements in Processes for Converting Catechin into Catechu-Tannic Acid; and we do hereby declare the following to be a full, clear, and exact description of the invention, such as will enable others skilled in the art to which it appertains to make and use the same.

The present invention relates to a process for converting catechin into catechu-tannic acid, involving certain technical advantages and also to a process for producing certain catechu preparations which will not discolor the teeth.

Catechu contains catechins of different compositions and also catechu-tannic acid. The latter forms the really effective tannin of the catechu and consists of two molecules of catechin condensed together with the elimination of a molecule of water. In order to convert the catechin contained in catechu to catechu-tannic acid and thus to increase the effective component parts of the catechu, it should be heated to 150° to 160° C.

Catechu-tannic acid is the monoanhydrid of catechin, and its chemical formula is $C_{36}H_{34}O_{15}$. Heated to 170 to 180° C. this monoanhydrid again looses water and is converted into a different body, which no longer possesses the valuable properties of catechu-tannic acid. In heating catechu or catechin alone, it is very difficult to maintain the exact temperature necessary for the formation of catechu-tannic acid, because, as above mentioned, a slight excess of temperature causes further alterations of the catechu-tannic acid. Experiments have shown that the reactive mass may be maintained at an exactly even temperature and a smooth reaction attained, if, instead of heating the catechu or catechin alone, it is mixed with a molten resinous mass (such as colophonium, gum-mastic, white resin, or the like) and then heated. In this manner catechin can be converted into catechu-tannic acid, without in any way further changing the latter by temporary localized excessive heating. In this process the catechu-tannic acid contained in the resin-mass is shielded from the oxidizing influence of the air, and cannot turn brown to the same extent as it does when heated alone, and not only this, but the catechu-tannic acid formed, is taken up by the resin mass *in statu nascendi* in a finely divided condition. From this resin mixture it may, if desired, be withdrawn after completion of the reaction, by the use of appropriate solvents. The described manner of operating is of particular advantage, when this intimate mixture of resin and catechu-tannic acid is intended to serve as a chewing preparation.

The valuable catechu-preparations hitherto known for the treatment of the gums (catechu, catechu-tannic acid, catechin, gambir) have the disadvantage that they color the teeth brown and for this reason they are not very extensively employed, in spite of their favorable healing effect. They have hitherto been employed in the form of tincture, or of cachou pills, smoking pills, grains de cachou, catechu lozenges, trochiscus catechu. This tincture of catechu is an alcoholic solution of catechu, which, when applied to the gum immediately colors the teeth brown. The cachou pills consist of catechu in combination with substances soluble in saliva, such as sugar, traganth, extractum liquiritiæ etc. and in use the catechu is easily dissolved by the saliva and then proceeds to color the teeth. For this reason the pills contain very little catechu, only about 0.0648 grs. each, so that comparatively slight healing effect is attained, from such a small quantity.

According to the present invention an efficient and enduring effect of the catechu-preparations on the gums and tissues of the mouth is attained, without the slightest discoloring of the teeth, since the catechu-preparations are not employed in solution or mixed with soluble substances, but mixed with an insoluble mass, which softens in the temperature present in the mouth and assumes a conveniently masticable consistency. The mass containing the catechu preparation consists advantageously of resins, such as gum mastic, Burgundy pitch, or white resin or gum, with or without the addition of stearin, paraffin, fat or wax. In chewing preparations of this description, the saliva gradually dissolves out the catechu substances, while the undissolved remaining mass entirely absorbs the coloring power of the catechu substances, so that the teeth will not be in the least discolored, while at the same time the beneficial effect of the catechu substance on the gums and tissues of the mouth will be utilized to the fullest extent. In this manner any desired quantity of the catechu substance may be employed, without the danger of discoloring the teeth so that a much more extensive use of this valuable healing medium for treating diseases of the mouth and teeth is rendered possible.

In making a masticable preparation from catechu or catechin according to the present invention, a kilogram of mastic may be melted together with 40 grams of stearin and brought to a temperature of about 100° C., when 250 grams of catechin may be added and stirred in. The mass is now brought to a temperature of about 150° C. and maintained at this point for about half an hour when it may be cooled and subdivided into portions or tablets of convenient size for chewing. When wax or paraffin is to form a component of the final article, such wax or paraffin may be added to the described molten mass prior to the addition of the catechin. The proportion to be added may be such as will give any desired physical consistency to the resulting masticable product. Whatever the composition of the particular fusible mass used in converting the catechu or catechin, it should not contain bodies soluble in the mouth and should be comparatively plastic and masticable at mouth temperatures.

We claim as our invention:—

1. The process of converting catechin into catechu-tannic acid which consists in heating a substance comprising catechin with a resinous body.

2. The process of converting catechin into catechu-tannic acid which consists in admixing a substance comprising catechin with a molten resinous body and heating.

3. The process of converting catechin into catechu-tannic acid and preparing a preparation adapted for medicating the mouth which consists in admixing a substance comprising catechin with a resinous mass containing a masticable resin insoluble in the mouth and heating the mixture.

4. A composition for medicating the mouth comprising a substance containing catechutannic acid and a masticable resin insoluble in the mouth.

5. A process of converting catechin into catechu-tannic acid and preparing a preparation adapted for medicating the mouth, comprising mixing a substance comprising catechin with a resinous mass containing admixed wax and heating the mixture.

6. A composition for medicating the mouth, comprising a substance containing catechutannic acid, a masticable resinous body insoluble in the mouth and a waxy body.

7. A composition for medicating the mouth comprising a substance containing catechutannic acid fused into and uniformly incorporated with a mass of fusible, plastic material insoluble in the mouth fluids and plastic at mouth temperatures.

In testimony whereof we hereunto affix our signatures in the presence of two witnesses.

WILHELM OSBORNE.
HEINRICH SCHUPP.

Witnesses:
ULYSSES J. BYWATER,
LOUIS MUELLER.